United States Patent

Orita et al.

[11] 4,036,751
[45] July 19, 1977

[54] METHOD OF TREATING WATER CONTAINING CHROMATE

[75] Inventors: Nobuhiro Orita; Koichi Yabe, both of Yokohama; Akifumi Kawanami, Kohnosu, all of Japan

[73] Assignee: Kurita Water Industries Ltd., Osaka, Japan

[21] Appl. No.: 681,781

[22] Filed: Apr. 30, 1976

[30] Foreign Application Priority Data

Jan. 23, 1976  Japan .................. 51-6807

[51] Int. Cl.² .......... B01D 15/06; B01J 1/09; C02B 1/56; C02B 1/76
[52] U.S. Cl. .................. 210/35; 210/37 B
[58] Field of Search .......... 210/27, 30 R, 32, 34, 210/35, 37 B, 38 A, 38 B, DIG. 30

[56] References Cited

U.S. PATENT DOCUMENTS

| 3,386,914 | 6/1968 | Hunter | 210/35 |
|---|---|---|---|
| 3,632,506 | 1/1972 | Adams | 210/34 |
| 3,639,231 | 2/1972 | Bresler | 210/30 R |
| 3,664,950 | 5/1972 | Saraceno | 310/35 |
| 3,679,580 | 7/1972 | Boari | 210/32 |
| 3,788,983 | 1/1974 | Fries | 210/37 B |
| 3,928,192 | 12/1975 | Katzakian | 210/38 A |
| 3,933,631 | 1/1976 | Adams | 210/34 |
| 3,961,029 | 6/1976 | Senoo | 210/38 B |
| 3,972,810 | 8/1976 | Chopra | 210/38 B |
| 3,982,956 | 9/1976 | Schoenrock | 210/30 R |
| 3,985,648 | 10/1976 | Casolo | 210/38 B |

FOREIGN PATENT DOCUMENTS

| 230,587 | 10/1960 | Australia | 210/35 |

*Primary Examiner*—Thomas G. Wyse
*Assistant Examiner*—Ernest G. Therkorn
*Attorney, Agent, or Firm*—Blanchard, Flynn, Thiel, Boutell & Tanis

[57] ABSTRACT

A method of treating water containing chromate by bringing the water-to-be-treated into contact with ion-exchange resins, which comprises: passing the water-to-be-treated through a bed of weakly acidic cation exchange resin in H-form at first; subsequently passing the same water through a bed of weakly basic anion exchange resin in salt form thereby to remove said chromate from the water; introducing an alkali metal hydroxide solution into said weakly basic anion exchange resin bed in the reverse direction relative to the direction of passing of the water thereby to elute chromate; and further introducing an acid solution therein thereby to convert the weakly basic anion exchange resin into salt form.

12 Claims, 15 Drawing Figures

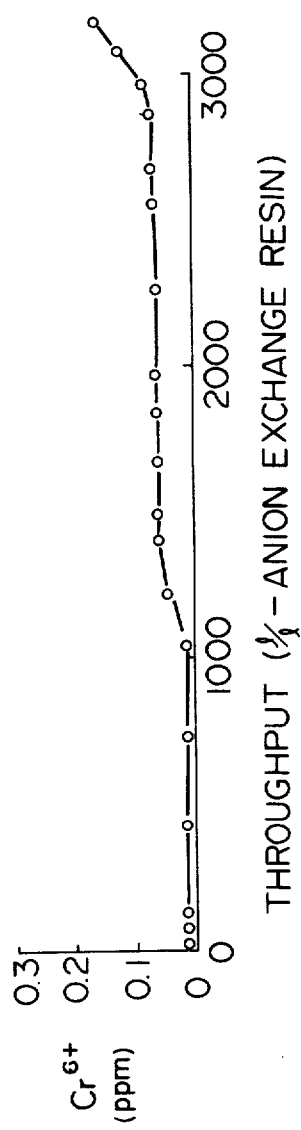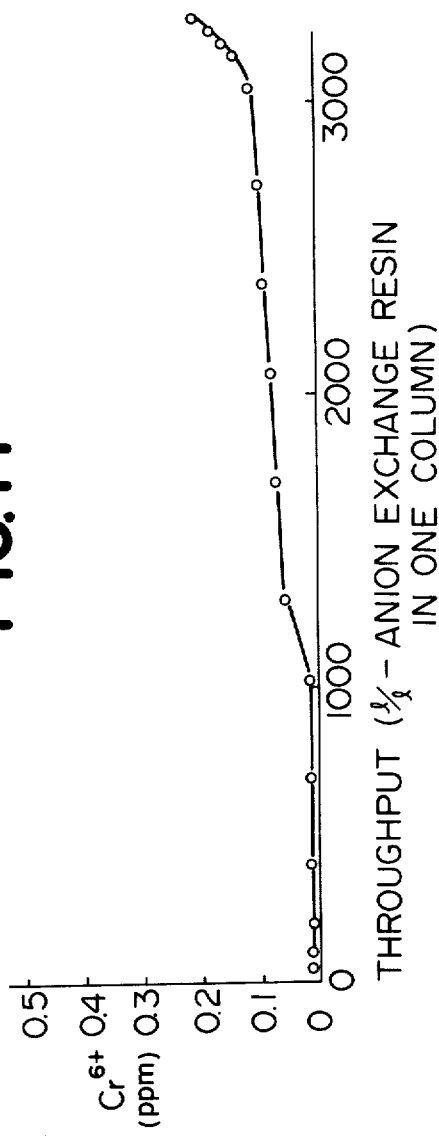

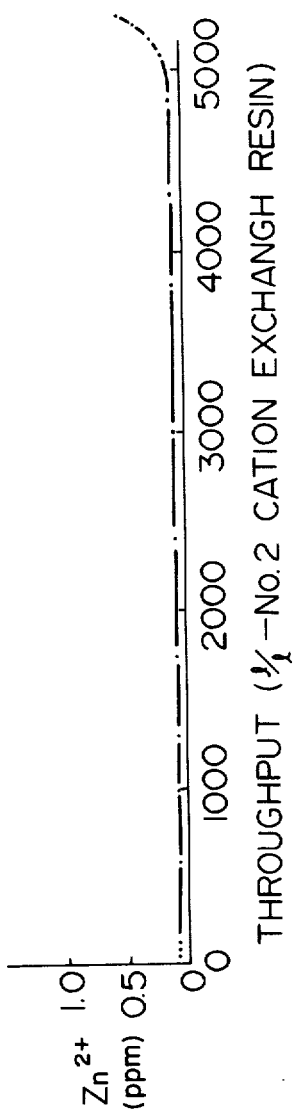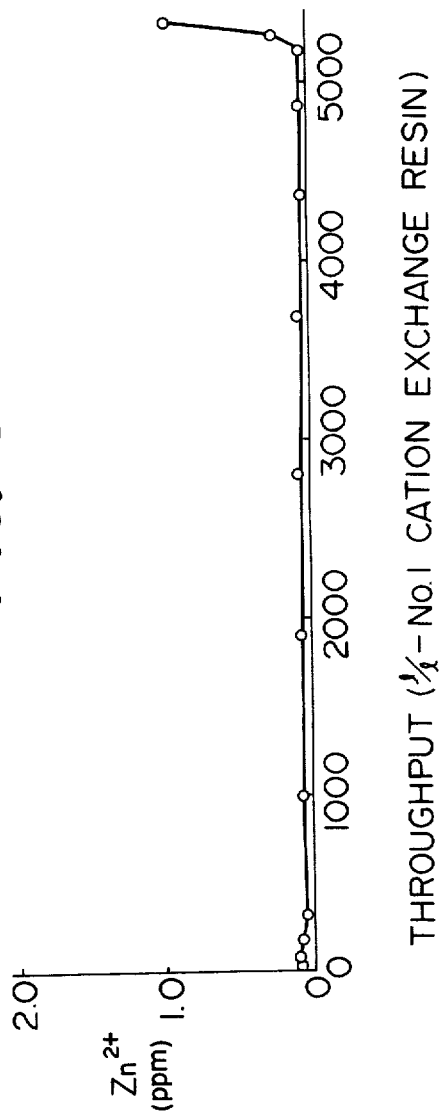

METHOD OF TREATING WATER CONTAINING CHROMATE

BACKGROUND OF THE INVENTION a. Field of the Invention

The present invention relates to a method of treating water containing chromate by bringing the water-to-be-treated into contact with ion-exchange resins thereby to remove said chromate.

b. Description of the Prior Art

Nowadays, it is common to add a chromate-based corrosion inhibitor to the open circulating type cooling water system for the purpose of preventing corrosion of metals employed for said cooling water system. A blowdown containing such a corrosion inhibitor (hereinafter called 'cooling-tower blowdown') usually has a yellow color and contains chromate (hexavalent chromium) of 100 ppm or thereabouts.

The waste water coming out of chromium plating shops employing chromic acid in great quantities also contains noxious chromate.

Pollution of rivers and seas attributable to the industrial waste waters has recently become a serious problem, and establishment of some equipment for treatment of waste water is a pressing need at various factories. As regards the cooling-tower blowdown, it also has lately become a subject of strict regulations from the viewpoint of preservation of the quality of public water basins and the environmental quality.

Under such circumstances, separation and removal of chromate from waste water by ion-exchange is common.

This common method is intended to remove chromate by selective adsorption using a weakly basic anion exchange resin in salt form. In this case, the adsorption by a weakly basic anion exchange resin easily occurs when the water-to-be-treated is rather acidic. In order to make the water slightly acidic, an acid or a cation exchange resin is used for pretreatment of the water-to-be-treated.

When chromate ions are adsorbed and removed by the use of a weakly basic anion exchange resin, a satisfactory chromate ion removal effect is realized. However, for the regeneration of the weakly basic anion exchange resin having chromate ions adsorbed thereon, the resin must be treated with alkali agent such as sodium hydroxide, because chromate can not be eluted even when directly treated with an acid solution.

The result of experiments conducted on chromate adsorbed ion-exchange resins containing adsorbed chromate to investigate the regenerativity thereof verifies that, until the chromate elution rate reaches about 85%, chromate can be eluted through the reaction of practical chemical equivalents, but further elution beyond this extent progresses gradually even if excess sodium hydroxide is employed; that is, the elution rate is confined to about 95% even when sodium hydroxide is employed in an amount of 8 times as much as the equivalent quantity of chromate adsorbed on said resin.

It is considered from this result that complete elution of chromate is infeasible, and regeneration of a weakly basic anion exchange resin having chromate adsorbed thereon is actually difficult. The resin after elution of chromate is in OH-form, and when the water-to-be-treated is passed through a bed of this resin, the resin reacts with metal ions (such as $Ca^{2+}$, $Mg^{2+}$, etc.) in the water thereby to bring on deposition of heavy metals on the resin, resulting in clogging and increase in leakage of chromate. To cope with this, it is popular to use a weakly basic anion exchange resin, a part or the entirety of which is converted into salt form by means of an acid, e.g., hydrochloric acid and sulfuric acid or a salt of such acids, e.g., sodium chloride and sodium sulfate after conversion of the said resin into OH-form. In this case, however, chromate adsorbed on the resin is eluted by means of an alkali agent, and regeneration of the resin cannot be performed to perfection, so there occur initial leakage and constant leakage of chromate.

SUMMARY OF THE INVENTION

A principal object of the present invention is to enhance the chromate ion removal efficiency in treating water containing chromate, and minimize the leakage of hexavalent chromium into the treated water.

Another object of the present invention is to minimize the initial leakage of chromate into the treated water.

A further object of the present invention is to regenerate the ion-exchange resins employed for treating water containing chromate with a small amount of regenerant.

A still further object of the present invention is to increase the amount of treated water.

An additional object of the present invention is to remove zinc ions as well as chromate from water.

Yet another object of the present invention is to efficiently recover chromate from water containing chromate.

BRIEF DESCRIPTION OF THE DRAWING

In the appended drawings:

FIG. 10 is a graph illustrating the change of leakage of $Cr^{6+}$ according to the through-put in Example 2;

FIG. 11 is a graph illustratingg the change of leakage of $Cr^{6+}$ in Example 3;

FIG. 14 is a graph illustrating the change of leakage of $Zn^{2+}$ according to the through-put in Example 5; and FIG. 15 is a graph illustrating the change of leakage of $Zn^{2+}$ according to the through-put in Example 6.

DETAILED DESCRIPTION OF THE INVENTION

Hereunder will be explained particulars of the present invention with reference to the appended drawings.

Figure 1:
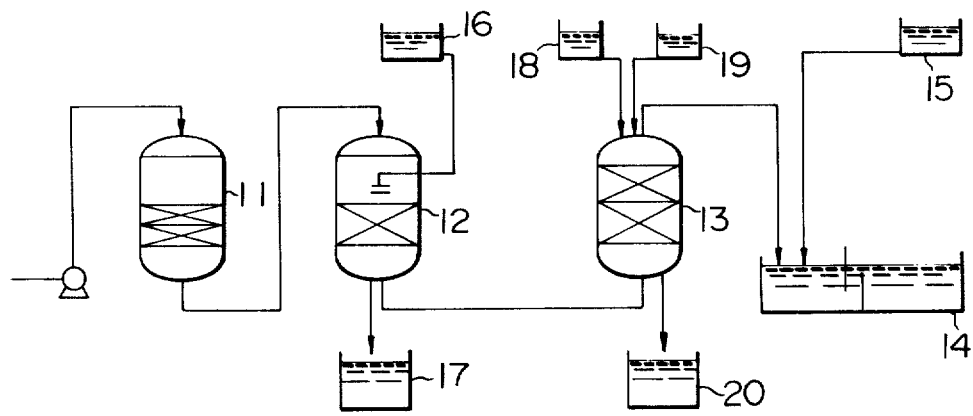
FIGS. 1 through 5 are flow-sheets of the embodiments of the present invention.

In the flow-sheet of FIG. 1 numeral 11 represents a filter. Water-to-be-treated is first introduced into the filter 11. A cooling-tower blowdown, particularly the circulating cooling-tower blowdown, contains suspended solids (SS) and SS is first removed in the filter 11. It is preferable to employ, as the filter 11, a multi-layer filter composed of stratified filter medias, e.g., sand, anthracite, etc. or an up-flow type filter which is devised to pass the water-to-be-treated upwardly.

The water-to-be-treated after removal of SS therefrom is next introduced into the cation exchange column 12. This cation exchange column 12 is packed with a weakly acidic cation exchange resin, which is converted into H-form in its entirety, or partialy converted into H-form while the remainder thereof being converted into Na-form. As the weakly acidic cation exchange resin, a porous ion-exchange resin is preferable.

When the water-to-be-treated is supplied to the cation exchange column 12, it comes into contact with an H-form weakly acidic cation exchange resin, whereby it is adjusted to be slightly acidic (pH 3–5). At the same time, divalent cations such as zinc and the like equivalent to weakly acidic anions such as bicarbonate ions contained in said water are also removed selectively.

When a weakly acidic cation exchange resin is employed for the cation exchange column 12, only acid salt such as bicarbonate is decomposed to change the pH value of the water slightly acidic, because the weakly acidic cation exchange resin has no neutral salt splitting capacity. If strongly acidic cation exchange resin is employed for the cation exchange column 12, the resin decomposes and adsorbs even a neutral salt, so that the ion-exchange resin is rapidly saturated and loses its adjustability for pH value of water.

The water-to-be-treated after having been adjusted to be acidic by means of the H-form weakly acidic cation exchange resin next enters an anion exchange column 13. This anion exchange column 13 is packed with a weakly basic anion exchange resin in salt form, such as Cl-form or SO$_4$-form. As the weakly basic anion exchange resin, like in the case of the weakly acidic cation exchange resin, a porous ion-exchange resin superior in ion-exchange ability and in resistance to the pollution with organic matters is preferable.

The water-to-be-treated passed through the cation exchange column 12 is already acidic, so the chromate ion within said water is already in the form of bichromate ion. Bichromate ion is greater in selective adsorbability toward anion exchange resin than chromate ion, therefore it is selectively adsorbed and removed in the anion exchange column 13. Besides, the quantity of the adsorbed chromium is enhanced because bichromate ion ($Cr_2O_7^{2-}$) contains two chromium elements in the radical. Inasmuch as the weakly basic anion exchange resin is in salt form, the resin never adsorbs metal ions such as $Mg^{2+}$, $Fe^{2+}$ and the like leaking from the cation exchange column 12 at the end of the treatment period.

The water-to-be-treated is passed through the anion exchange column 13 upwardly. Due to the upward current of the water-to-be-treated, the lower portion of the weakly basic anion exchange resin bed is in fludizied state, while the greater part of upper portion of said resin bed is pressed against the overhead collector within the exchange column 13 to form a fixed bed. In the case where the fixed bed consists of more than 50%, preferably more than 90%, of the whole quantity of said weakly basic anion exchange resin, adsorption of bichromate ion can be effected satisfactorily. It is advisable to make the flow rate in the anion exchange column be more then LV 10 m/h, preferably be in the range of from 20 to 30 m/h. Introduction of the water-to-be-treated is continued until the leakage of chromium into the treated water attains a fixed value, e.g., 0.1 ppm (as hexavalent chromium). The resulting treated water is neutralized in a neutralization tank 14 by adding an appropriate amount of alkali agent supplied from the alkali measuring tank 15 prior to discharge.

For the regenerating step, hydrochloric acid is first supplied to the cation exchange column 12 from an acid measuring tank 16 thereby to convert the weakly acidic cation exchange resin into H-form. The spent regenerant containing ions of metals such as zinc is collected in a storage tank 17.

To the anion exchange column 13 is first supplied an alkali metal hydroxide solution such as NaOH, KOH or the like downwardly from an alkali measuring tank 18 thereby to elute bichromate ion from the weakly basic anion exchange resin and convert the resin into OH-form. In the wake of the alkali solution, an acid solution such as HCl, $H_2SO_4$ or the like is supplied downwardly from an acid measuring tank 19 thereby to convert the OH-form resin into salt form.

A spent regenerant containing alkali metal hydrroxide and eluted bichromate ion and another spent regenerant containing acid solution are collected in a storage tank 20. The collected spent regenerant containing bichromate ion is reused as a corrosion inhibitor of the cooling water of the like.

In the anion exchange column 13, inasmuch as bichromate ion is first eluted with an alkali metal hydroxide, regeneration of the resin can be effected more efficiently than direct regeneration with an acid. The salt form resin converted with an acid adsorbs bichromate ion efficiently.

When the regeneration is performed by passing the regenerant in reverse direction relative to the direction of passing the water-to-be-treated, the resin located in the downstream of the flow of the water is perfectly regenerated with the fresh regenerant flowing into the column. Therefore, initial leakage and constant leakage of bichromate can be minimized during the operation and, the amount of regenerant can be economized. By virtue of the downward flow of the regenerant, the entirety of the weakly basic anion exchange resin is densely fixed on the lower support during the regeneration time and the regeneration efficiency can be much enhanced.

Figure 2:
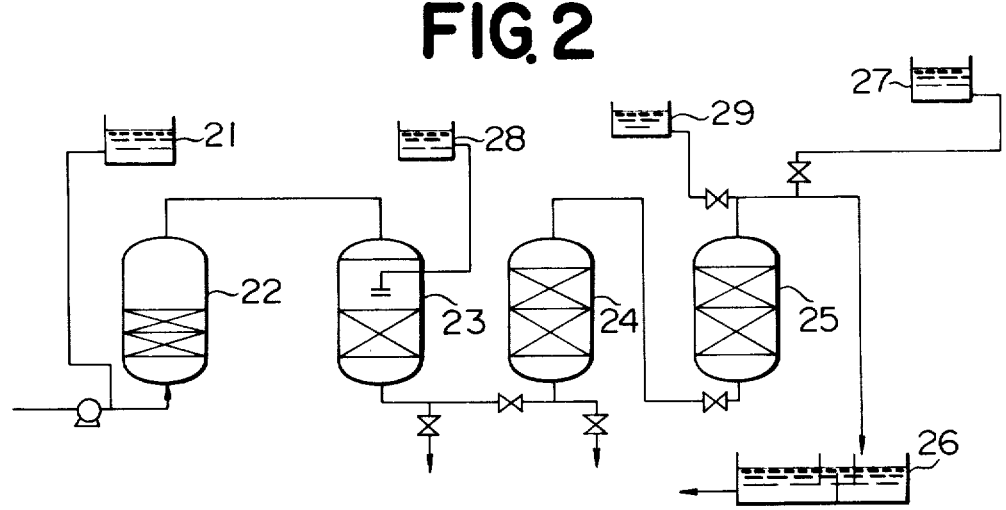

FIG. 2 is illustrative of another embodiment of the present invention which is different from the apparatus of FIG. 1 in that it is provided with a couple of anion exchange columns packed with salt-form weakly basic anion exchange resin.

In FIG. 2, after addition of a coagulant supplied from a coagulant storing tank 21, water containing chromate is passed through a filter 22, a cation exchange column 23, No. 1 anion exchange column 24 and No. 2 anion exchange column 25 in that order. Then the treated water is neutralized in a neutralization tank 26 with an alkali agent supplied from a alkali measuring tank 27 and is discharged.

Regeneration of the cation exchange resin is performed by supplying an acid from the acid measuring tank 28 like in the case of the embodiment in FIG. 1.

As to regeneration of the anion exchange resin, an alkali metal hydroxide solution supplied from the measuring tank 27 is passed through No. 2 anion exchange column 25 thereby to regenerate the anion exchange resin in the column 25, and then the spent regenerant coming out of No. 2 anion exchange column 25 is passed through No. 1 anion exchange column 24 thereby to regenerate the resin in the column 24. Subsequently, an acid solution supplied from an acid measuring tank 29 is passed through the same route as that for said alkali metal hydroxide solution, whereby the weakly basic anion exchange resin is converted to salt form.

Although the direction of passing of the water-to-be-treated through the anion exchange columns is illustrated to be upward in FIG. 2, it is possible to pass the water downwardly and to pass the regenerant upwardly. However, in at least one column of No. 1 anion exchange column 24 and No. 2 anion exchange column 25, the direction of passing of the water and the direction of passing of the regenerant should be opposite to each other.

According to this process, inasmuch as the water-to-be-treated is passed through No. 1 anion exchange column 24 and No. 2 anion exchange column 25 in that order while the regenerant is passed though No. 2 column 25 and No. 1 column 24 in that order, practically perfect regeneration of No. 2 column 25 can be expected and the quality of treated water is improved.

Passing of the water-to-be-treated is discontinued when the leakage of chromium in the treated water coming out of No. 2 anion exchange column 25 has reached a fixed value. The amount of unused weakly basic anion exchange resin (i.e., the amount of resin with no chromium adsorbed thereon) at the end of the passing of water is less than that in the case of an apparatus with a single anion exchange column, and the amount of treated water comes to be greater. In other words, in the case of the apparatus with a single column, there remains unused weakly basic anion exchange resin on the downstream side of the current of water (i.e., the overhead portion of the column when the water is passed upwardly) at the end of the passing of water. Meanwhile, in the case of the apparatus with double column, the first column (i.e., No. 1 anion exchange column 24) comes to be entirely saturated with chromium, and there only remains unused weakly basic anion exchange resin on the downstream side in the second column (i.e., No. 2 anion exchange column 25). Therefore, the amount of unused resin is lessened as a whole.

The above mentioned effect of a double column type apparatus becomes conspicuous when the amount of resin packed in the second column (or No. 2 anion exchange column 25) is less than that in the first column (or No. 1 anion exchange column 24), and a preferable ratio of the amount of resin to be packed in the first column to that in the second column is in the range of from 1:1 to 3:1. The less the amount of resin to the second column relative to the first column, the more effective is the regeneration of the second column. The foregoing effect can be much enhanced where the direction of passing of the water is upward and the direction of passing of the regenerant is downward in No. 1 column 24 and No. 2 column 25.

Figure 3:
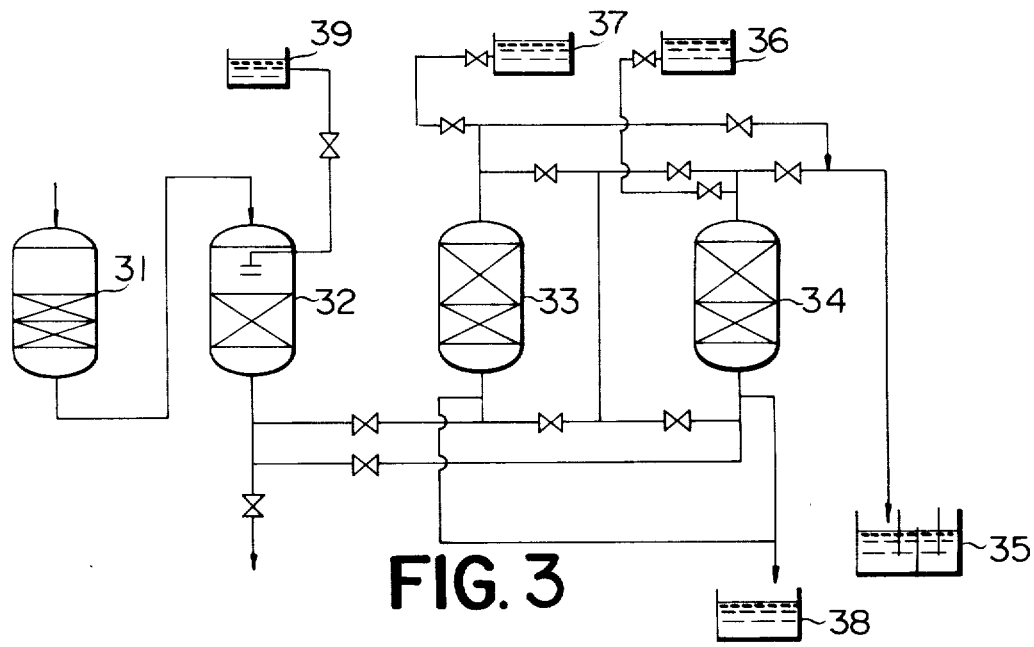

FIG. 3 is illustrative of a process wherein the passing of water through anion exchange columns and the regeneration of the columns are to be performed alternately. In the drawing, 31 denotes a double layer filter, 32 denotes a cation exchange column packed with a weakly acidic cation exchange resin, and 33, 34 denote respectively an anion exchange column packed with a weakly basic anion exchange resin.

For the treatment cycle No. $n-1$, water-to-be-treated is passed through a double layer filter 31, a cation exchange column 32, an anin exchange column 33 and an anion exchange column 34 in that order, and then the treated water is led into a neutralization tank 35. The direction of passing of the water-to-be-treated through the both columns 33, 34 is the upward direction. At the time of regeneration, hydrochloric acid is supplied to the cation exchange column 32 from an acid measuring tank 39, whereby the weakly acidic cation exchange resin therein is regenerated to be H-form. Meanwhile, an alkali metal hydroxide solution supplied from an alkali measuring tank 36 is passed downwardly through the anion exchange column 33 and, in the wake thereof, an acid solution supplied from an acid measuring tank 37 is also passed downwardly through the column 33. The resulting spent regenerant is collected in a storage tank 38. In cycle No. $n-1$, the anion exchange column 34 is not subjected to regeneration.

For the succeeding cycle No. $n$, the water-to-be-treated is passed through the double layer filter 31, the cation exchange column 32, the anion exchange column 34 and the anion exchange column 33 in that order, and then the treated water is led into the neutralization tank 35. The direction of the water flow in the anion exchange columns 33 and 34 is upward. The regeneration of the cation exchange resin is performed in the same way as in cycle No. $n-1$. For the regeneration of the anion exchange resin, an alkali metal hydroxide solution supplied from the alkali measuring tank 36 is passed downwardly through the anion exchange column 34 and, in the wake thereof, an acid solution supplied from the acid measuring tank 37 is also passed downwardly through the column 34. The resulting spent regenerant is collected in the storage tank 38. For the next cycle No. $n+1$, the passing of water-to-be-treated and the regeneration of ion exchange resin are performed in the same way as for said cycle No. $n-1$.

In this process, the second anion exchange column passing the water-to-be-treated therethrough is almost regenerated perfectly with downwardly passing regenerant, and the initial leakage and the constant leakage of chromate are minimized. The resin in the first anion exchange column is utilized in its entirety at the time of passing the water-to-be-treated, and the amount of treated water is increased.

As illustrated in FIGS. 1 through 5, a layer of inert resin is formed on each anion exchange resin bed. The inert resin is supposed to be lower in specific gravity than the anion exchange resin and larger in grain size than the opening of the treated water collector. The inert resin layer is not always necessary, but it prevents clogging of the opening of the treated water collector due to finely crushed granules which get in the anion exchange resin layer.

When the water-to-be-treated contains zinc ion together with chromate ion, a part of zinc ions contained in the water is adsorbed and removed with a weakly acidic cation exchange resin which selectively adsorbs divalent cation rather than monovalent cation. However, the presence of many divalent ions such as $Ca^{2+}$, $Mg^{2+}$, etc. in the water greatly influences the removal rate of zinc ion.

In order to remove zinc together with chromate efficiently, it is advisable to apply the following processes.

On of the processes is to convert a portion of the H-form weakly acidic cation exchange resin packed in the cation exchange columns illustrated in FIGS. 1 through 3 into Na-form. This conversion can be effected by passing a sodium hydroxide solution through the cation exchange column after converting the resin packed therein into H-form weakly acidic cation exchange resin with an acid. The amount of said sodium hydroxide solution to be passed is the amount enough to leave H-form weakly acidic cation exchange resin in an amount sufficient for attaining a slight acidity (pH value of about 3 to 5) when the water-to-be-treated is passed through the cation exchange column. It is desirable to convert 5 to 50% of the entire exchange capacity of the weakly acidic cation exchange resin into Na-form. A N-form weakly acidic cation exchange resin, removes more $Ca^{2+}$, $Mg^{2+}$ and $Zn^{2+}$ contained in the water-to-be-treated than a H-form weakly acidic cation exchange resin. However, when the resin is entirely converted into Na-form, it loses the ability to reduce the pH value of a liquid passing through the cation exchange column. Therefore, a portion of the weakly acidic cation exchange resin is supposed to be converted into Na-form thereby to retain the $Zn^{2+}$ removing ability as well as the pH reducing ability.

Figure 4:
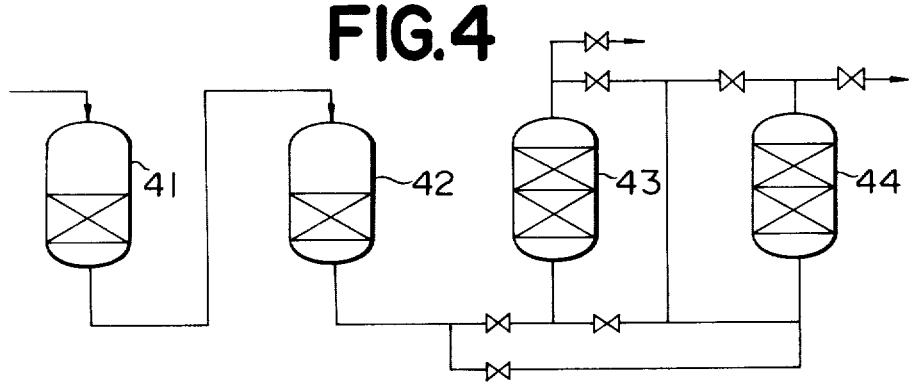
Figure 5:
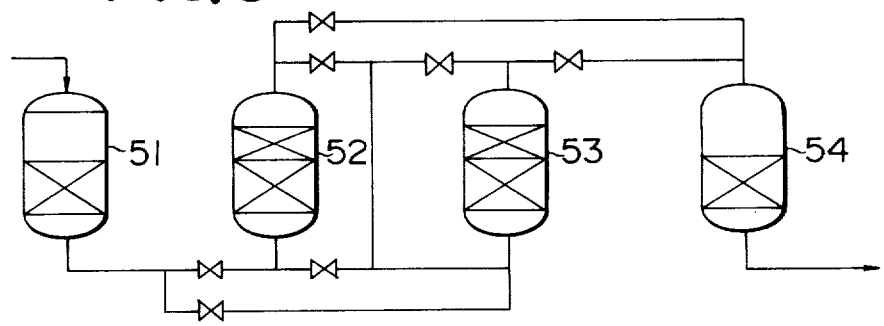

Another process is to divide the cation exchange column packed with a weakly acidic cation exchange resin into two columns, as exemplified in FIG. 4 and FIG. 5.

In FIG. 4 and FIG. 5, numerals 41, 54 denote respectively a cation exchange column packed with Na-form weakly acidic cation exchange resin, 42, 51 denote respectively a cation exchange column packed with H-form weakly acidic cation exchange resin, and 43, 44, 52, 53 denote respectively an anion exchange column packed with weakly basic anion exchange resin.

In the process illustrated in FIG. 4, the water-to-be-treated is passed through the cation exchange columns 41, 42 downwardly and through the anion exchange columns 43, 44 upwardly in series. The cation exchange resin is regenerated by passing an acid solution through the cation exchange column 42 and 41 in series, and then the resin of the cation exchange column 41 is converted with a sodium hydroxide solution into Na-form. Regeneration of the anion exchange columns 43, 44 is performed by applying the same process as illustrated in FIG. 3. According to this process, not only the chromate removing effect can be expected, because of the adjustment of pH value of the water-to-be-treated and the removal of zinc therefrom can be easily performed.

In the process illustrated in FIG. 5, the cation exchange column 51 adjusts the pH value of the water-to-be-treated and removes a portion of zinc. Chromate is removed in the anion exchange columns 52, 53, and residual zinc is completely removed in the cation exchange column 54. Moreover, according to this process, the final treated water has been neutralized with the Na-form weakly acidic cation exchange resin packed in the cation exchange column 54.

The advantages of the method of the present invention will be clearly understood from the comparison of the following examples according to the conventional method with several examples employing the method of the present invention.

Comparative Example according to the conventional method 500 ml of porous weakly acidic cation exchange resin, Lewatit CNP (the manufacture of Bayer Co.) were packed in a cation exchange column and 1,000 ml of porous weakly basic anion exchange resin Lewatit MP-64 (the manufacture of Bayer Co.) were packed in an anion exchange column. Then, said cation exchange resin was regenerated with hydrochloric acid (the applied amount of regenerant (hereinafter represented by R.L): 100g HCl/1-R), while said anion exchange resin was regenerated with sodium hydroxide (R.L: 100g NaOH/1-R) and subsequently regenerated with hydrochloric acid (R.L: 25g HCl/1-R).

Through the thus regenerated ion exchange resins was passed a cooling-tower blowdown containing 500 ppm of total ions as $CaCO_3$, 10 ppm of chromate as $Cr^{6+}$, 20 to 30 ppm of M-alkali as $CaCO_3$ and 5 ppm of $Zn^{2+}$ at the rate of 20 l/h. In this connection, the direction of passing of both the water and the regenerant through the cation exchange column and anion exchange column was downward direction.

Figure 6:
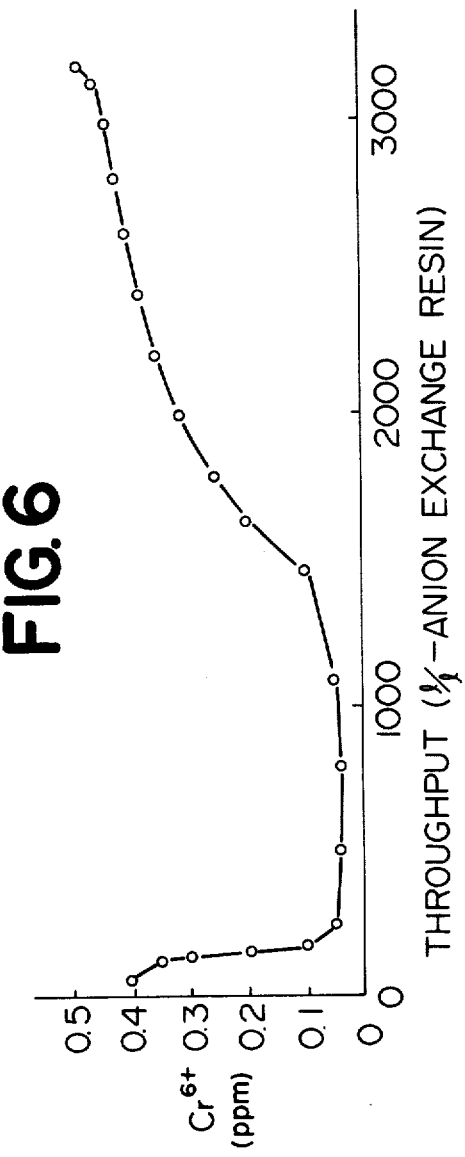
FIGS. 6 and 7 are graphs illustrating the change of leakage of $Cr^{6+}$ and $Zn^{2+}$ according to the through-put in the conventional method.
Figure 7:
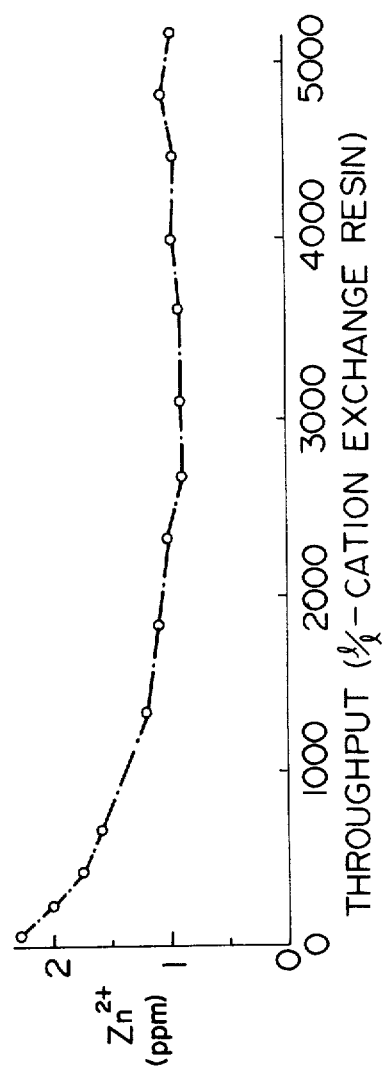

When the respective leakage of $Cr^{6+}$ and $Zn^{2+}$ according to the through-put of cooling-tower blowdown was examined, the result was as shown in FIG. 6 and FIG. 7, respectively. In this conventional method, both the initial leakage and the constant leakage were observed with respect to $Cr^{2+}$ and $Zn^{2+}$.

EXAMPLE 1.

In a process represented by the flow-sheet shown in FIG. 1, 500 ml of porous weakly acidic cation exchange resin Lewatit CNP-80 were packed in the cation exchange column and 1,000 ml of porous weakly basic anion exchange resin Lewatit MP-64 were packed in an anion exchange column. Then, said cation exchange resin was regenerated with hydrochloric acid (R.L: 100g HCl/1-R), while said anion exchange resin was regenerated with sodium hydroxide (R.L: 60g NaOH/1-R) and subsequently regenerated with hydrochloric acid (R.L: 55g HCl/1-R). Through the thus regenerated ion exchange resins was passed a cooling-tower blowdown having the same quality as that in the foregoing Comparative Example according to the conventional method. In this connection, regeneration of the anion exchange column was performed through the counter current process, to wit, by passing the regenerant downwardly while passing the water-to-be-treated upwardly, and the anion exchange resin on this occasion was entirely in Cl form.

Figure 8:
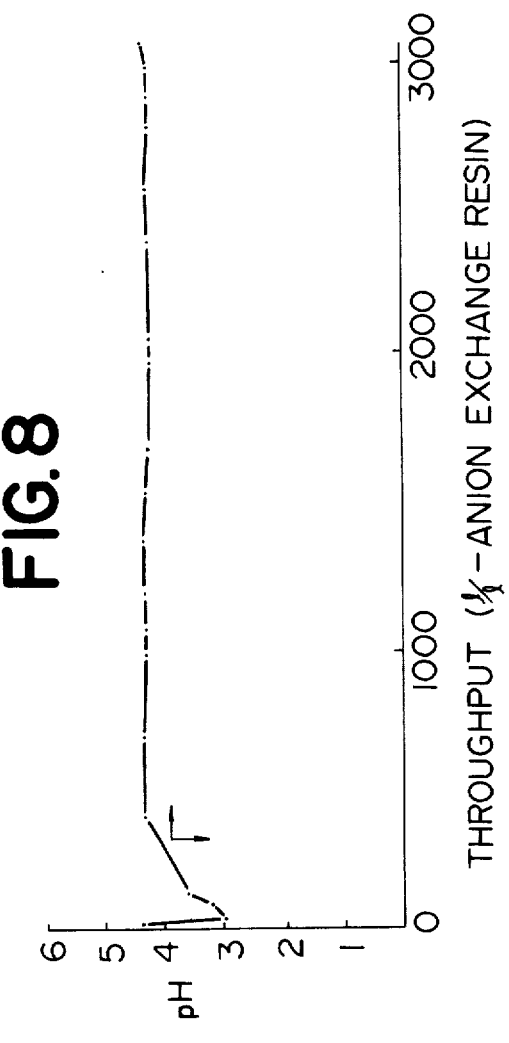
FIGS. 8 and 9 are graphs illustrating change of pH and leakage of $Cr^{6+}$ and according to the through-put in Example 1.
Figure 9:
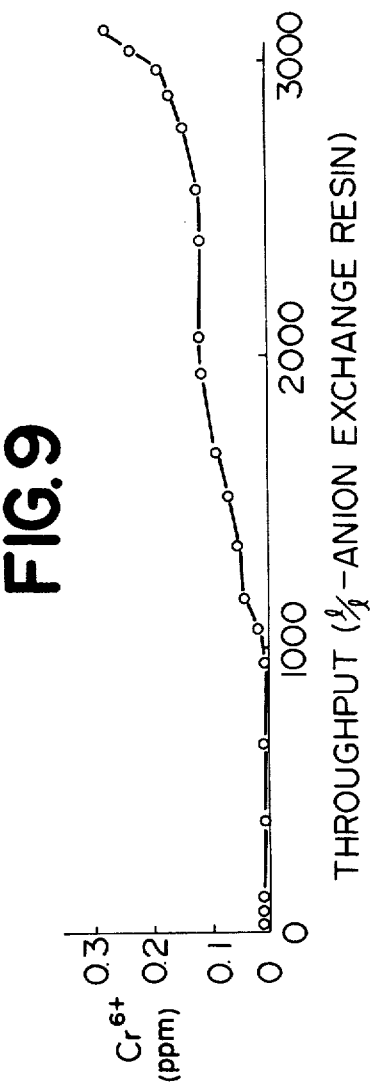

Shown in FIG. 8 and FIG. 9 respectively is the change of the pH and the leakage of $Cr^{6+}$ according to the change of through-put of the cooling-tower blowdown.

EXAMPLE 2

In a process represented by the flow-sheet shown in FIG. 2, 500 ml of porous weakly acidic cation exchange resin Lewatit CNP-80 were packed in the cation exchange column and 1,000 ml and 500 ml of porous weakly basic anion exchange resin Lewatit MP-64 were respectively packed in anion exchange columns No. and No. 2. Then, said cation exchange resin was regenerated with hydrochloric acid (R.L: 100g HCl/1-R), while said anion exchange resin of anion exchange columns No. 1 and No. 2 was regenerated with sodium hydroxide (R.L: 60g NaOH/1-No. 1, 2R) and subsequently regenerated with hydrochloric acid (R.L: 55g HCl/1-No. 1, 2R) in numerical order by passing regenerant therethrough in series. In this connection, regeneration of both anion exchange columns No. 1 and No. 2 was performed through the counter current process, to wit, by passing the regenerant downwardly while passing the water-to-be-treated upwardly, and the quality of the cooling-tower blowdown on this occasion was the same as that in Example 1.

Shown in FIG. 10 is the change of the leakage of $Cr^{6+}$ according to the change of through-put of the cooling-tower blowdown.

EXAMPLE 3.

In a process represented by the flow-sheet shown in FIG. 3, 500 ml of porous weakly acidic cation exchange resin Lewatit CNP-80 were packed in the cation exchange column and 1,000 ml of porous weakly basic anion exchange resin Lewatit MP-64 were respectively packed in both anion exchange columns. Then, said cation exchange resin was regenerated with hydrochloric acid (R.L: 100g HCl/l-R) and subsequently regenerated with sodium hydroxide (R.L: 17g NaOH/l-R), while said anion exchange resin was regenerated with sodium hydroxide (R.L: 100g NaOH/l-R) and subsequently was regenerated with hydrochloric acid (R.L: 55g NaOH/l-R) by passing the regenerant downwardly. Regeneration of the anion exchange resin on this occasion was performed by regenerating anion exchange columns No. 1 and No. 2 alternately at every cycle.

After regeneration at cycle No. $n$, a cooling-tower blowdown with a pH value of 6.6 to 7.3, about 500 ppm of total ion concentration, 4 ppm of $Zn^{2+}$ and 10 ppm of chromium as $Cr^{6+}$ was passed through the cation exchange column and both anion exchange columns upwardly.

Shown in FIG. 11 is the change of the leakage of $Cr^{6+}$ according to the change of through-put of the cooling-tower blowdown in the present example.

When the leakage of chromium in the treated water reached to 0.05 ppm, passing of the water was discontinued. Subsequently, a sodium hydroxide solution was passed through the anion exchange resin bed, whereby chromate was eluted. The composition of the elute on this occasion was shown in the following Table-1 in contrast with that in the foregoing Comparative Example according to the conventional method. The volume of the recovered elute was respectively 6,000 ml.

Table-1

|  |  | Present Example | Comparative Example |
|---|---|---|---|
| chromium | (ppm at $Cr^{6+}$) | 5,320 | 1,670 |
| Cl | (ppm as $Cl^-$) | 800 | 1,200 |
| $SO_4$ | (ppm as $SO_4^{2-}$) | 11,000 | 8,220 |

As will be clear from the showing in the above Table-1, the quantities of adsorbed chromate and of treated water of the present invention are larger than the conventional method.

EXAMPLE 4.

Figure 12:
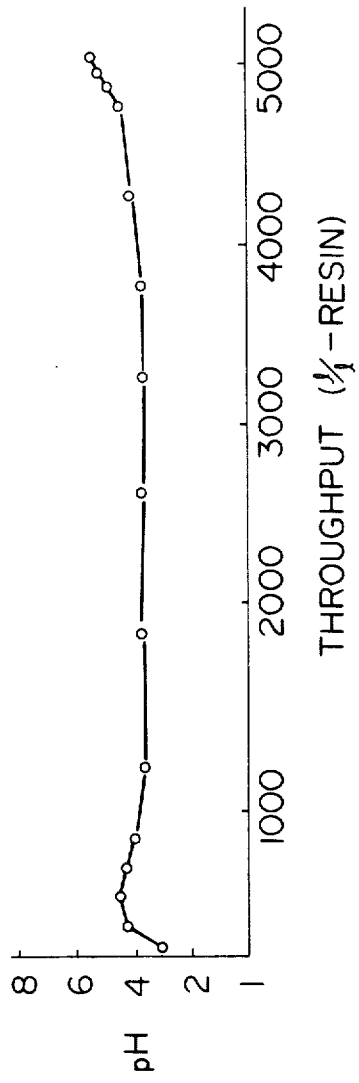
FIGS. 12 and 13 are graphs illustrating the change of pH and leakage of $Zn^{2-}$ according to the through-put in Example 4; 15
Figure 13:
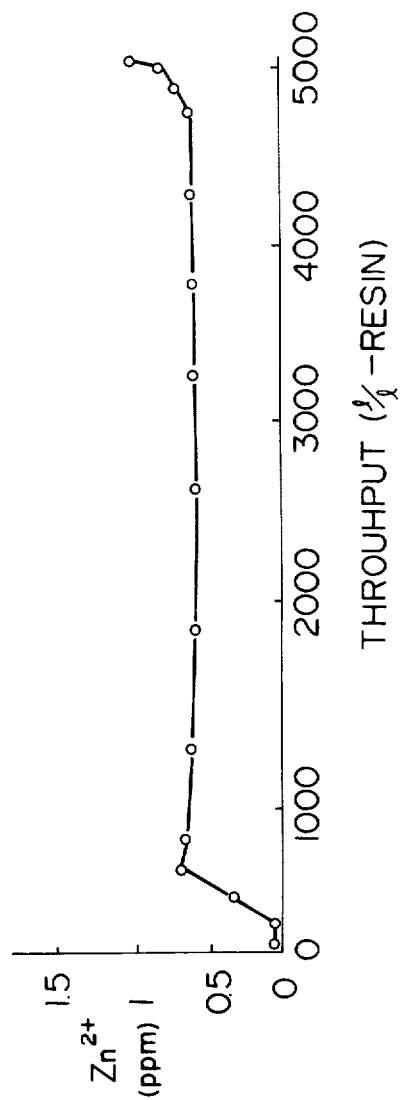

By applying the same process as in Example 1, a test was conducted in the same way as in Example 1 excepting that the regeneration of cation exchange column was performed with hydrochloric acid (R.L: 100g HCl/l-R) and subsequently with sodium hydroxide (R.L: 17g NaOH/l-R) thereby to convert a portion of cation exchange resin into Na-form. As a result, the change of the pH value and the leakage of zinc according to the change of through-put of the cooling-tower blowdown was as shown in FIG. 12 and FIG. 13 respectively. The leakage of zinc from the outset could be checked and the chromium removing effect was the same as in Example 1.

EXAMPLE 5.

In a process represented by the flow-sheet shown in FIG. 4, 500 ml of porous weakly acidic cation exchange resin Lewatit CNP-80 were packed in both cation exchange column No. 1 and No. 2. Then, said cation exchange resin was regenerated with hydrochloric acid (R.L: 200g HCl/l-No. 1, No. 2R) and subsequently regenerated with sodium hydroxide (R.L: 150g NaOH/l-No. 1 cation exchange resin exclusively). A cooling-tower blowdown with the same quality as in Example 1 was passed therethrough. The leakage of zinc according to the through-put of the cooling-tower blowdown was as shown in FIG. 14. The chromium removing effect was the same as in Example 2.

EXAMPLE 6.

In a process represented by the flow-sheet shown in FIG. 5, 500 ml of porous weakly acidic cation exchange resin Lewatit CNP-80 were packed in both cation exchange columns No. 1 and No. 2, and 1,000 ml of porous weakly basic anion exchange resin Lewatit MP-64 were packed in both anion exchange columns No. 1 and No. 2.

The resin in cation exchange column No. 1 was regenerated with hydrochloric acid (R.L: 100g HCl/l-R), and the resin in anion exchange columns No. 1 and No. 2 were regenerated with sodium hydroxide (R.L: 100g NaOH/l-R) and hydrochloric acid (R.L: 55g HCl/l-R) respectively. The resin in cation exchange column No. 2 was regenerated with hydrochloric acid (R.L: 150g HCl/l-R) and subsequently with sodium hydroxide (R.L: 80g NaOH/l-R). A cooling-tower blowdown with the same quality as in Example 1 was passed therethrough. The leakage of zinc according to the through-put of the cooling-tower blowdown was as shown in FIG. 15. The chromium removing effect was the same as in Example 2.

As will be clear from the respective example shown in the foregoing, the initial leakage and the constant leakage of chromate ions in the present invention is reduced. and the amount of treated water per anion exchange resin is increased compared with the method in the prior art.

The amount of treated water increases sharply when a couple of anion exchange columns are provided.

What is claimed is:

1. A method of treating water contaminated with chromate ions, which consists essentially of the steps of
    a. flowing said water through a bed of weakly acidic cation exchange resin, at least a major portion of which is in H-form, to adjust the pH of the water to from 3 to 5 and to transform the chromate ions in said water to bichromate ions,
    b. then passing the water discharged from step (a) through one or more beds of weakly basic, salt-form, anion exchange resin to remove bichromate ions from said water,
    c. and recovering a treated water product from the water discharged from step (b)

the steps (a), (b) and (c) being carried out until the bichromate ion content of the treated water product rises to a selected level,
    d. then flowing an alkali metal hydroxide solution through said bed of beds of weakly basic anion exchange resin in the reverse direction to the direction in which the water has previously been flowed therethrough in order to elute the bichromate ion therefrom and to convert said weakly basic anion exchange resin to the hydroxyl form, e. flowing an acid solution through said bed or beds of weakly basic anion exchange resin to transform same into said salt form, f. flowing an acid solution through said bed of cation exchange resin to transform same to weakly acidic cation exchange resin in H-form and then repeating the steps (a), (b) and (c).

2. A method according to claim 1 in which in step (b) the water is flower upwardly through said bed or beds of weakly basic, salt-form, anion exchange resin, and in steps (d) and (e) the alkali metal hydroxide solution and the acid solution are flowed downwardly through said bed or beds, respectively.

3. A method according to claim 1 in which there are employed first and second beds of said anion exchange resin, and in which in step (b) the water is flowed through said first bed and then through said second bed.

4. A method according to claim 3 in which the weight ratio of anion exchange resin in the first bed: second bed is from 1:1 to 3:1.

5. A method according to claim 5 in which the steps (d) and (e) the alkali metal hydroxide solution and the acid solution, respectively, are flowed through said second bed and then through said first bed.

6. A method according to claim 6 in which in step (b) the water is flowed upwardly through said first bed and then upwardly through said second bed, and in steps (d) and (e) the alkali metal hydroxide solution and the acid solution, respectively, are flowed downwardly through said first bed, then repeating steps (a), (b) and (c) wherein in step (b) the water is flowed upwardly through said second bed and then upwardly through said first bed, and in the subsequent steps (d) and (e) the alkali metal hydroxide solution and the acid solution, respectively, are flowed downwardly through said second bed.

7. A method according to claim 3 in which in step (b) the water is flowed upwardly through said first and second beds and in steps (d) and (e) the alkali metal hydroxide solution and the acid solution, respectively, are flowed downwardly though said beds.

8. A method according to claim 8 in which in step (b) the water is flowed upwardly through said first bed and is flowed downwardly through said second bed and in steps (d) and (e) the alkali metal hydroxide solution and the acid solution are flowed downwardly through said second bed and then are flowed downwardly through said first bed.

9. A method according to claim 9 in which a portion of said weakly acidic cation exchange resin is in H-form and the remainder thereof is in Na-form and in which the step (e) after flowing said acid solution through said bed of cation exchange resin, a sodium hydroxide solution is flowed through said bed of cation exchange resin to transform a portion of the cation exchange resin to Na-form.

10. A method according to claim 9, in which in step (a) said bed of weakly acidic cation exchange resin contains from 5 to 50 weight percent of Na-form resin and the balance of said resin is H-form resin.

11. A method according to claim 1 in which before step (a) the water is flowed through a bed of weakly acidic, Na-form, cation exchange resin and in step (a) the water is flowed through a bed of weakly acidic, H-form, cation exchange resin.

12. A method according to claim 1 in which in step (a) the bed of weakly acidic cation exchange resin is in H-form and, between steps (b) and (c) the water from step (b) is flowed through a bed of weakly acidic, Na-form, cation exchange resin.

* * * * *